Sept. 5, 1939. H. F. OBERGFELL Re. 21,200

CIRCUIT CONTROLLING DEVICE

Original Filed Nov. 12, 1934

INVENTOR.

HERBERT F. OBERGFELL

BY

R. B. Richardson

ATTORNEY.

Reissued Sept. 5, 1939

Re. 21,200

UNITED STATES PATENT OFFICE 21,200

CIRCUIT CONTROLLING DEVICE

Herbert F. Obergfell, River Forest, Ill., assignor, by mesne assignments, to Associated Electric Laboratories, Inc., a corporation of Delaware Original No. 2,057,911, dated October 20, 1936, Serial No. 752,612, November 12, 1934. Application for reissue August 8, 1938, Serial No. 223,729

12 Claims. (Cl. 175—375)

The present invention relates in general to circuit controlling devices and, more particularly, to cyclically operating devices of this character which perform a counting function which is necessary in order to correlate properly a sequence of operations with a related sequence in respect to their numerical values.

It is an object of the present invention to provide a simple and highly efficient mechanical device of this character.

Further objects and advantages of the invention will become apparent as the following description proceeds and the features of novelty which characterize the invention will be pointed out with particularity in the claims annexed to and forming a part of this specification.

Figure 1:
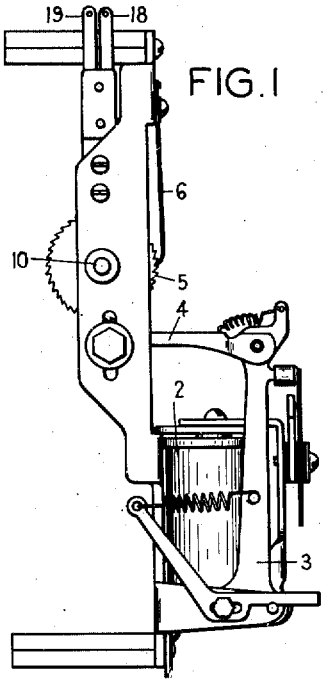
Figure 2:
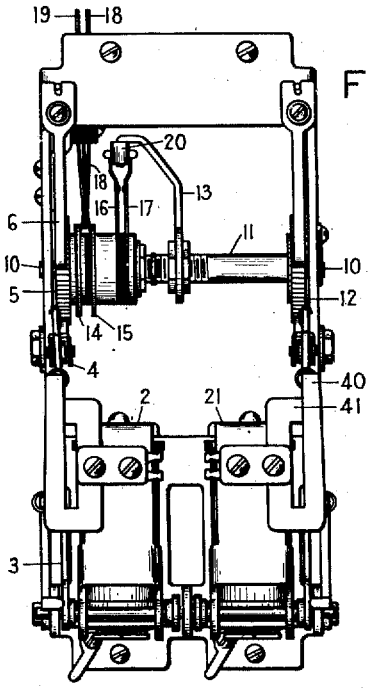
Figure 4:
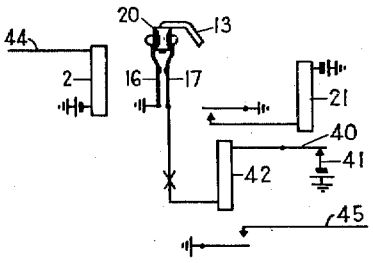
Figure 3:
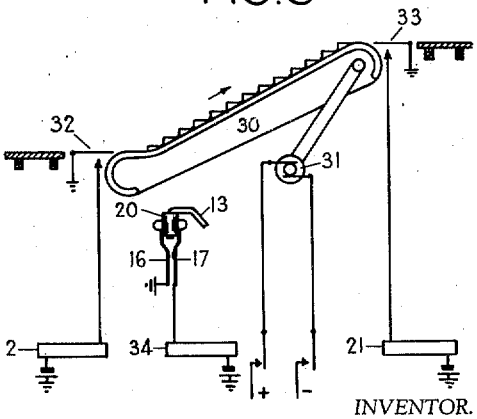

For a better understanding of the invention, reference may be had to the accompanying drawing in which Figure 1 is a side elevational view of a circuit controlling device embodying the invention; Fig. 2 is a front elevational view of the device shown in Fig. 1; Fig. 3 is a schematic circuit diagram of a system for controlling an escalator and incorporating the device as shown in Figs. 1 and 2; and Fig. 4 is a schematic diagram of an impulse repeater incorporating this device.

Referring to Fig. 2 of the drawing, there is shown a circuit controlling device comprising two stepping mechanisms supported in a common frame. The left-hand stepping mechanism, Fig. 2, also shown in Fig. 1, comprises essentially a magnet 2, an armature 3, a pawl 4, a ratchet wheel 5, and a holding detent 6. The right-hand stepping mechanism is the same. The mechanical construction may be substantially the same as shown in U. S. patent to Erickson, No. 1,794,888, granted March 3, 1931. Hence it will not be necessary to go further into details.

There is a shaft 10 extending transversely of the frame as seen in Fig. 2. The ratchet wheel 5 is rotatably supported on the shaft 10 and has a hub on which are mounted certain circuit elements. These comprise two slip rings 14 and 15 and two contact springs 16 and 17. Spring 16 is electrically connected with slip ring 15 and spring 17 with slip ring 14.

Connections are extended to the two slip rings 14 and 15 by means of two brushes 18 and 19, seen clearly in Figs. 1 and 2. These enable the springs 16 and 17 to be rotated always in the same direction.

The ratchet wheel 12 of the right-hand stepping mechanism is also rotatable mounted on shaft 10, and has a hub 11, on which is secured an arm 13. This arm carries an insulating bushing 20, which in the normal position of the device lies between and separates the two contact springs 16 and 17.

It will be seen now that if the left-hand stepping mechanism is operated, the hub carrying springs 16 and 17 will be rotated, so that on the first step these springs will leave bushing 20 and will make electrical contact with each other. The effect of this is to bridge together the brushes 18 and 19. The brushes 18 and 19 may thus be used to close a circuit for initiating some desired operation, which will continue as long as the circuit remains closed. However, the right-hand mechanism may now be operated by some agency, usually related to the operation which has been initiated, with the result that the hub 11 carrying arm 13 will be rotated, and in the same direction as springs 16 and 17. When the steps taken by the right-hand mechanism equal those taken by the left-hand mechanism the bushing 20 will again separate springs 16 and 17 and the circuit including brushes 18 and 19 will be opened.

From the foregoing description of the construction and arrangement of the circuit controlling device, it will be understood that the portions of the springs 16 and 17 disposed adjacent the ends thereof constitute a first member movable step by step along a peripheral path and the bushing 20 constitutes a second member movable step by step along a common path and that the cooperating contacts carried by the springs 16 and 17 are controlled jointly by these members.

The utility of the device will be better appreciated by consideration of several circuit arrangements in which it is used. These arrangements shown in Figs. 3 and 4, will now be described briefly.

Fig. 3 shows a scheme for automatically starting and stopping an escalator. The reference character 30 indicates the escalator, and 31 is a motor for driving it. At the foot of the escalator there is arranged a treadle or hinged step 32 in such a way that each passenger seeking to use the escalator must necessarily pass over it. Upon being depressed by the weight of a person stepping on it, the treadle 32 will close a circuit for magnet 2, which is the stepping magnet of the left-hand stepping mechanism shown in Fig. 2. At the top of the escalator there is a similar treadle 33, which is momentarily depressed by each person leaving it. The treadle 33 controls a circuit for magnet 21, which is the stepping magnet of the right-hand stepping mechanism shown in Fig. 2. There is also a relay 34, which controls the motor 31. Relay 34 is included in circuit with the springs 16 and 17. To simplify the drawing, the slip ring connections to these springs have been omitted.

Assume now that people approach the escalator to be carried up to the next floor. As each person passes over treadle 32 an impulse is transmitted to magnet 2 and after each impulse terminates the ratchet wheel 5 and hub carrying springs 16 and 17 will be advanced one step. Upon the first step being completed, the springs 16 and 17 will close, and the circuit of relay 34 will be completed. Relay 34 accordingly pulls up and starts motor 31. The escalator is now running. As the passengers arrive at the top, each of them will step on treadle 33, thus sending an impulse to stepping magnet 21. The right-hand stepping mechanism therefore begins to operate also and the ratchet 12 and hub 11 will rotate arm 13 in pursuit of the springs 16 and 17. As long as passengers keep on arriving at the escalator close enough together so that there is always someone on it, the number of steps taken by the left-hand stepping mechanism will be greater than the number taken by the right-hand mechanism, and springs 16 and 17 will remain closed. However, in a period when no more passengers arrive, impulses to magnet 2 will cease, but the impulses to magnet 21 will continue until all the passengers have left the escalator. When the last passenger leaves, the impulses received by the two stepping magnets 2 and 21 will be equal, and the arm 13 will catch up with springs 16 and 17, separating them again by means of bushing 20. This deenergizes the relay 34 and stops the escalator. Thus, the first member is moved a predetermined number of steps away from its start position, which constitutes a synchronous position with respect to the second member, in accordance with the number of persons entering the escalator; and the second member is moved the same predetermined number of steps away from its start position in accordance with the number of persons leaving the escalator, thereby to establish a new synchronous position with respect to the first member.

Referring now to Fig. 4, this circuit drawing shows how the invention may be used as the essential part of an automatic regenerative impulse repeater. In the drawing 44 is a conductor over which incoming impulses are received, while 45 is the conductor over which it is desired to transmit a corresponding number of outgoing impulses. Also 42 is an impulse generating relay. The other parts are the same as explained hereinbefore and bear the same reference numbers. The arrangement requires, however, that the stepping magnet 21 be supplied with a pair of break contact springs, labeled 40 and 41, for controlling the circuit of relay 42.

Assume now that a series of impulses is received over conductor 44. Magnet 2 responds and rotates springs 16 and 17 step by step. When the first step is completed springs 16 and 17 make contact, completing a circuit for relay 42. This relay energizes and closes a circuit for stepping magnet 21. Upon energizing, magnet 21 opens the circuit of relay 42 at contact springs 40 and 41. Relay 42 therefore falls back and breaks the magnet circuit, with the result that the magnet is deenergized to advance ratchet 12 and arm 13, and again close springs 40 and 41. This operation continues as long as springs 16 and 17 remain closed, relay 42 and magnet 21 functioning as an automatic stepping arrangement. Each time relay 42 operates it sends an impulse over outgoing conductor 45.

Assuming now that the incoming impulses cease, the advance of springs 16 and 17 will stop. The operation of magnet 21 and relay 42 will continue, however, until the arm 13 brings its bushing 20 into position to separate springs 16 and 17. When this occurs the number of impulses transmitted over the outgoing conductor 45 will equal the number received over incoming conductor 44.

In this impulse repeater it is noted that the magnet 2 is operated to rotate the first member away from a synchronous position a predetermined number of steps corresponding to the number of impulses received by way of the conductor 44 and that the magnet 21 is automatically operated in response to the rotation of the first member to rotate the second member a like number of steps to establish a new synchronous position and to cause a like number of impulses to be transmitted by way of the conductor 45. Also, further movement of the second member is positively arrested when the new synchronous position is established due to the disengagement of the contacts carried by the springs 16 and 17 and the consequent interruption of the operating circuit of the relay 42.

In a repeater as described in the foregoing, the transmission of impulses starts at once, but the arrangement is also capable of use in register sender systems for example where the transmission has to be delayed. It is merely necessary to insert a normally open contact in the circuit of relay 42, as for instance at the point X, which contact is closed by appropriate means at the time the transmission is to start. The left-hand stepping mechanism will then function as a register, and the other stepping mechanism will function as a sender to transmit impulses in accordance with the setting of the register.

While there have been described what are at present considered to be the preferred embodiments of the invention, it will be understood that various modifications may be made therein without departing from the invention, and it is intended in the appended claims to cover all such modifications as fall within the true spirit and scope of the invention.

What is claimed is:

1. In a circuit controlling device, a pair of contact members rotatable about an axis, a control member rotatable about the same axis and having means for separating said contact members when the angular position of the control member bears a predetermined relation to the position of the contact members, means for advancing the contact members to a new position, thereby closing said contact members, and means for advancing said control member a like amount to again open said contact members.

2. In a circuit controlling device, two rotatable elements having a common axis of rotation, means for rotating either element independent of the other, a circuit adapted to be completed through the first element and excluding any portion of the second element, and non-conducting means included in the second element arranged to open said circuit when the angular positions of said elements correspond to equal degrees of rotation.

3. In a circuit controlling device, a ratchet wheel, an electromagnetically actuated armature and pawl for driving said wheel, a second ratchet wheel, an electromagnetically actuated armature and pawl for driving said second ratchet wheel, a pair of contact springs attached to said first wheel but insulated therefrom, and a member attached to said second wheel for separating said contact springs.

4. In a circuit controlling device, a shaft, two ratchet wheels rotatably mounted on said shaft, two stepping magnets for supplying power for driving said two ratchet wheels, respectively, a pair of contact springs secured to one of said ratchet wheels, a member attached to the other ratchet wheel for mechanically separating said contact springs when the said wheels are in positions corresponding to equal degrees of rotation, and means for energizing either stepping magnet independent of the other.

5. In a cyclically operating circuit controlling device, first and second members independently movable in the same direction along a common path, said members having a synchronous position with respect to each other which may occur at any point along said path, circuit controlling contacts controlled jointly by said members and closed when said members occupy a predetermined position with respect to each other, means for moving said first member away from a synchronous position, thereby to initiate a cycle of operation, means for moving said second member to establish a new synchronous position, thereby to complete the cycle of operation, and means for positively preventing further movement of said second member prior to further movement of said first member after a new synchronous position is established.

6. In a cyclically operating circuit controlling device, first and second members independently movable step by step in the same direction along a common path, said members having a synchronous position with respect to each other which may occur at any step along said path, circuit controlling contacts controlled jointly by said members and closed when said members occupy a predetermined position with respect to each other, means for moving said first member step by step away from a synchronous position, thereby to initiate a cycle of operation, means for moving said second member step by step to establish a new synchronous position, thereby to complete the cycle of operation, and means for positively preventing further movement of said second member prior to further movement of said first member after a new synchronous position is established.

7. In a cyclically operating circuit controlling device, first and second members independently movable in the same direction along a common path, said members having a synchronous position with respect to each other which may occur at any point along said path, circuit controlling contacts controlled jointly by said members and closed when said members occupy a predetermined position with respect to each other, means including a first motor operable to move said first member away from a synchronous position, thereby to initiate a cycle of operation, means including a second motor operable to move said second member to establish a new synchronous position, thereby to complete the cycle of operation, and means for positively preventing further operation of said second motor prior to further operation of said first motor after a new synchronous position is established.

8. In a cyclically operating circuit controlling device, first and second members independently rotatable step by step in the same direction about a common axis, said members having a synchronous position with respect to each other which may occur at any angular step, circuit controlling contacts controlled jointly by said members and closed when said members occupy a predetermined position with respect to each other, means including a first motor operable to rotate said first member step by step away from a synchronous position, thereby to initiate a cycle of operation, means including a second motor operable to rotate said second member step by step to establish a new synchronous position, thereby to complete the cycle of operation, and means for positively preventing further operation of said second motor prior to further operation of said first motor after a new synchronous position is established.

9. In a cyclically operating circuit controlling device, first and second members independently movable in the same direction along a common path, said members having a synchronous position with respect to each other which may occur at any point along said path, circuit controlling contacts controlled jointly by said members and closed when said members occupy a predetermined position with respect to each other, means for moving said first member away from a synchronous position, thereby to initiate a cycle of operation, automatic means responsive to the movement of said first member away from a synchronous position for moving said second member to establish a new synchronous position, thereby to complete the cycle of operation, and means for positively preventing further movement of said second member prior to further movement of said first member after a new synchronous position is established.

10. In a cyclically operating circuit controlling device, first and second members independently movable in the same direction along a common path, said members having a synchronous position with respect to each other which may occur at any point along said path, a pair of circuit controlling contacts controlled jointly by said members, said pair of contacts having open and closed contact positions, means for moving said first member a predetermined distance away from a synchronous position, thereby to initiate a cycle of operation, means for moving said second member said predetermined distance to establish a new synchronous position, thereby to complete the cycle of operation, said members being so constructed and arranged that said pair of contacts occupies a predetermined one of said contact positions only when said members occupy synchronous positions, and means controlled by said pair of contacts for positively preventing further movement of said second member prior to further movement of said first member after a new synchronous position is established.

11. In a cyclically operating circuit controlling device, first and second members independently movable in the same direction along a common path, said members having a synchronous position with respect to each other which may occur at any point along said path, a pair of circuit controlling contacts controlled jointly by said members, said pair of contacts having open and closed contact positions, means including a first motor operable to move said first member away from a synchronous position, thereby to initiate a cycle of operation, means including a second motor operable to move said second member to establish a new synchronous position, thereby to complete the cycle of operation, said members being so constructed and arranged that said pair of contacts occupies a predetermined one of said contact positions only when said members occupy synchronous positions, and means controlled by said pair of contacts for positively preventing further operation of said second motor prior to further operation of said first motor after a new synchronous position is established.

12. In a cyclically operating circuit controlling device, first and second members independently rotatable step by step in the same direction about a common axis, said members having a synchronous position with respect to each other which may occur at any angular step, a pair of circuit controlling contacts controlled jointly by said members, said pair of contacts having open and closed contact positions, means including a first motor operable to rotate said first member a predetermined number of steps away from a synchronous position, thereby to initiate a cycle of operation, means including a second motor operable to rotate said second member said predetermined number of steps to establish a new synchronous position, thereby to complete the cycle of operation, said members being so constructed and arranged that said pair of contacts occupies a predetermined one of said contact positions only when said members occupy synchronous positions, a control circuit for said first motor, a control circuit for said second motor, and means including said pair of contacts for controlling said second-mentioned control circuit.

HERBERT F. OBERGFELL.